(12) United States Patent
Nulty et al.

(10) Patent No.: US 6,320,939 B1
(45) Date of Patent: Nov. 20, 2001

(54) REMOTE TELEPHONY TESTING DEVICE

(75) Inventors: Gregory M. Nulty, Gibsonia, PA (US); Larry Mortimer, Woodstock, GA (US)

(73) Assignee: Tollgrade Communications, Inc., Wilmington, DE (US)

( * ) Notice: Subject to any disclaimer, the term of this patent is extended or adjusted under 35 U.S.C. 154(b) by 0 days.

(21) Appl. No.: 09/142,528
(22) PCT Filed: Mar. 26, 1997
(86) PCT No.: PCT/US97/04873
 § 371 Date: Sep. 9, 1998
 § 102(e) Date: Sep. 9, 1998
(87) PCT Pub. No.: WO97/36413
 PCT Pub. Date: Oct. 2, 1997

Related U.S. Application Data
(60) Provisional application No. 60/014,458, filed on Mar. 28, 1996.

(51) Int. Cl.[7] .................................................. H04M 1/24
(52) U.S. Cl. .................. 379/27.01; 379/1.01; 379/27.03; 379/29.01
(58) Field of Search .................................. 379/26, 27, 6, 379/29, 1, 1.01, 2, 1.04, 9, 10.01, 12, 21, 22, 22.02, 22.04, 22.05, 26.01, 26.02, 27.03, 29.01, 29.05

(56) References Cited

U.S. PATENT DOCUMENTS

| 5,018,184 | 5/1991 | Abrams et al. | 379/29 |
| 5,054,050 | 10/1991 | Burke et al. | 379/27 |
| 5,111,497 | 5/1992 | Bliven et al. | 379/27 |
| 5,361,293 | * 11/1994 | Czerwiec | 379/30 |
| 5,471,517 | * 11/1995 | Nakagawa | 379/29 |

* cited by examiner

Primary Examiner—Curtis Kuntz
Assistant Examiner—Rexford N. Barnie
(74) Attorney, Agent, or Firm—Webb Ziesenheim Logsdon Orkin & Hanson, P.C.

(57) ABSTRACT

A remote telephone testing device (22) includes a transmitter (30), a receiver (24), a controller (26) and a test circuit (28). In response to the receiver (24) receiving a test signal from a test system (20) via a telephone network (2, 4, 6, 8), the controller (26) communicatively isolates telephone equipment (10) of a subscriber (S) from the telephone network (2, 4, 6, 8) and connects the test circuit (28) to the telephone equipment (10). The test circuit (28) tests the telephone equipment (10) and conveys one or more results of such test to the controller (26) which relays the one or more results to the test system (20) via the transmitter (30). When testing is complete, the telephone equipment (10) is isolated from the test circuit (28) and is communicatively connected to the telephone network (2, 4, 6, 8).

22 Claims, 3 Drawing Sheets

REMOTE TELEPHONY TESTING DEVICE

CROSS REFERENCE TO RELATED APPLICATION

This application claims the benefit of earlier filed U.S. Provisional Patent Application Ser. No. 60/014,458, filed on Mar. 28, 1996.

BACKGROUND OF THE INVENTION

1. Field of the Invention

This invention relates to telephone equipment and more specifically to test apparatus for remotely testing telephone equipment.

2. Description of the Prior Art

The use of fiber optics in telephone networks continues to evolve due to, among other things, its inherent high reliability to superimpose a large number of telephone communication on a single fiber and its inherent lack of susceptibility to electromagnetic noise. It is believed that fiber optics will eventually replace conductive wires that heretofore have been utilized to connect telephone equipment of one or more subscribers to the telephone network. Until that time, however, there remains a need to utilize the conductive wires and the telephone equipment adapted to work with signals transmitted over such wires.

Prior to the evolution of fiber optics in telephone networks, testing of telephone equipment of one or more subscribers could be conducted remotely from a switching network. However, as the use of fiber optics in telephone networks evolved, the ability to perform remote testing has been affected because of the mixed use of fiber optics and conductive wires.

Until fiber optics replace the conductive wires and the telephone equipment of one or more subscribers it will be necessary and/or desirable to maintain or improve the testability of the conductive wires and the telephone equipment connected thereto. Preferably, the existing conductive wires could be utilized thus protecting the investment in existing testing infrastructure.

Heretofore, measurements of the conductive wire network, including telephone equipment, of a subscriber was enabled by a remote testing device placed adjacent the telephone equipment of the subscriber for measuring a number of parameters concerning the condition of the conductive wires and the telephone equipment. The problem with these prior art measurement systems is the absence of relays and switches necessary for the test equipment to gain unimpeded access to the conductive wires and telephone equipment of the subscriber. Another problem with these prior art systems is they require a separate communications channel to transmit the results of the test back to a central location for analysis. For example, previous systems have utilized a public switched telephone network voice channel for communication using dial-up modem technology. This of course diminishes revenue generating capacity by using up one of the voice channels.

In another methodology, test equipment is embedded in a maintenance and operations channel of the fiber optic system. This, however, requires additional equipment at a central location to extract the information from the maintenance and operations channel. Moreover, many of these fiber optic systems cannot present the information to existing test equipment, thus requiring a stand alone computer terminal to view the results.

It is therefore an object of the present invention to provide an apparatus and method for testing the conductive wires and telephone equipment of a remote subscriber utilizing existing test equipment. It is object of the present invention to utilize the available communications channels to transmit test signals to the remote testing devices and to receive test results back therefrom. It is an object of the present invention to provide test capability for remote multiplexer systems that do not have access relays installed.

SUMMARY OF THE INVENTION

Accordingly, we have invented a testing apparatus for testing telephone equipment of a subscriber which is communicably connected to a switching machine. The testing apparatus includes a controller, a test circuit for testing the telephone equipment, a receiver and a relay means. In response to the receiver receiving a test signal the controller causes the relay means to disconnect the telephone equipment from communication with the switching machine and to connect the test circuit into communication with telephone equipment. The testing apparatus further includes a transmitter and may include a test termination. The controller causes the relay means to connect the transmitter and the test termination into communication with the switching machine in response to the receiver receiving the test signal.

In another embodiment, a testing apparatus for testing telephone equipment of a subscriber includes a first relay having telephone equipment connected to one side thereof, a controller, a receiver connected between the controller and the side of the first relay opposite the telephone equipment, a second relay and a test circuit. The second relay and the test circuit are connected in series between the controller and the telephone equipment side of the first relay. The controller, in response to receiving a test signal via the receiver, causes the first relay to open, thereby disconnecting the receiver side of the first relay from the telephone equipment side thereof and causes a second relay to close, thereby connecting the test circuit to the telephone equipment. A transmitter and a third relay are connected in series between the controller and the receiver side of the first relay. In response to receiving the test signal, the controller causes the third relay to close, thereby connecting the transmitter to the receiver side of the first relay. A test termination and a fourth relay are connected in series between the controller and the receiver side of the first relay. The controller, in response to receiving the test command signal, causes the fourth relay to close, thereby connecting the test termination to the receiver side of the first relay. A relay controller controls the opening and closing of the first relay, the second relay, the third relay and the fourth relay in response to receiving a command signal from the controller. A fifth relay is connected in series between the receiver side of the first relay and at least one of the transmitter and the test termination. The controller, in response to receiving the test signal, causes the fifth relay to close, thereby connecting the at least one of the transmitter and the test termination to the receiver side of the first relay.

In another embodiment, a telephone network for communicatively connecting two or more subscribers includes a switching apparatus adapted to communicatively connect telephone equipment of a plurality of subscribers and a testing apparatus connected between the switching apparatus and the telephone equipment of at least one of the subscribers. The testing apparatus includes a test circuit for testing the telephone equipment, a receiver, a transmitter and a plurality of relays. In response to the receiver receiving a test signal from the switching apparatus the plurality of relays (i) communicatively disconnecting the telephone equipment of the at least one subscriber from the switching network and (ii) communicatively connecting the test circuit to the telephone equipment of the at least one subscriber. The test circuit test the telephone equipment of the at least one subscriber and the transmitter communicates to the switching apparatus a result of the test circuits test of the telephone equipment of the at least one subscriber. A first multiplexer is connected between the switching apparatus and the telephone equipment of the at least one subscriber. The first multiplexer converts signals received thereby between a first communication medium and a second communication medium and vice versa. A second multiplexer is connected between the first multiplexer and the telephone equipment of the at least one subscriber. The second multiplexer converts signals received thereby between the second communication medium and a third communication medium and vice versa. The third communication medium may be one of the first or second communication mediums. A test head is connected to the switching apparatus for controlling the operation of the testing apparatus via the switching apparatus. A test termination having a desired impedance is provided. In response to the receiver receiving a test signal from the switching apparatus, one or more of the plurality of relays connect the test termination into communication with the switching apparatus. A controller is connected to the receiver, the transmitter and the test circuit. A relay controller is connected between the plurality of relays and the controller wherein in response to receiving the test signal via the receiver, the controller controls the operation of at least one of the test circuit, the transmitter and the relay controller. More specifically, in response to receiving the test signal via the receiver the controller causes the relay controller to control the opening/closing of the plurality of relays.

In another embodiment, a method of testing telephone equipment of a subscriber is provided. In the method, telephone equipment is disconnected from communication with a telephone switching network and a test circuit is connected to the telephone equipment. The telephone equipment is tested by the test circuits and the results of the testing are communicated to the telephone switching network via a transmitter that is connected into communication with the telephone switching network. A test termination is connected into communication with the switching network. The test termination provides impedance matching to the signal from the telephone switching network in the absence of the telephone equipment being communicatively connected to the telephone switching network. A test signal received via a receiver communicatively connected to the telephone switching network initiates at least one of the disconnecting step, the connecting step and the testing step. When testing of the telephone equipment is complete, the test circuit is disconnected and the telephone equipment is connected into communication with telephone switching network.

DESCRIPTION OF THE PREFERRED EMBODIMENTS

Figure 1:
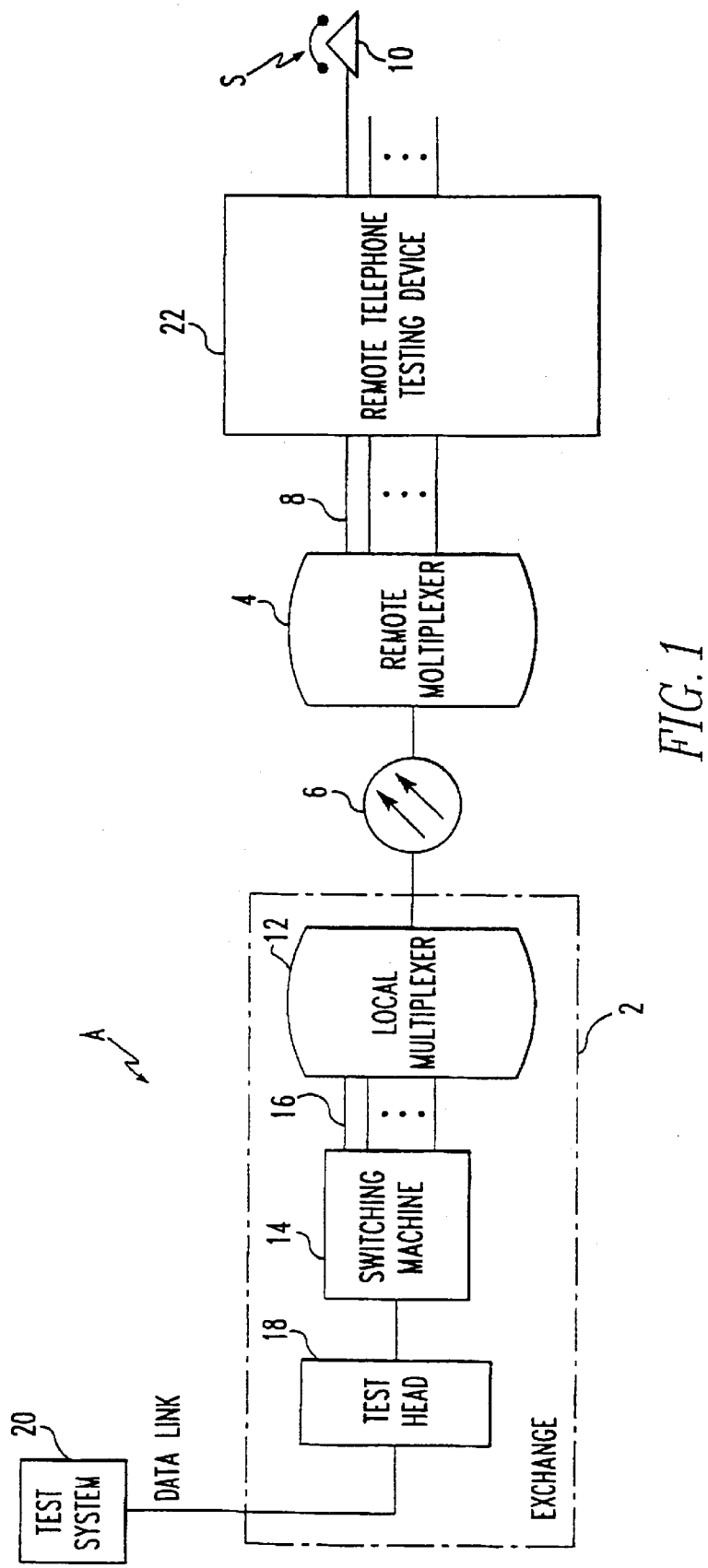
FIG. 1 is a diagrammatic illustration of a telephone network including a remote telephone testing device in accordance with the present invention.

With reference to FIG. 1, a telephone network A is utilized to communicatively connect together two or more subscribers S. More specifically, the telephone network A includes a telephone exchange 2 communicatively connected to a remote multiplexer 4 via a first communication medium 6. Preferably, the first communication medium 6 is a digital facility, such as, for example, a fiber optic cable or a radio link. Digital signals received by the remote multiplexer 4 via the first communication medium 6 are converted into analog or digital signals for transmission over a second communication medium 8 to telephone equipment 10 of a subscriber S. Preferably, the second communication medium 8 is one or more conventional electrically conductive wires. The telephone equipment 10 process the transmitted signals into information, e.g., voice or data. The telephone equipment 10 also enables transmission of analog or digital signals from the telephone equipment 10 of the subscriber S to the remote multiplexer 4 via the second communication medium 8. The remote multiplexer 4 converts the analog or digital signals transmitted by the telephone equipment 10 into digital signals for transmission to the telephone exchange 2 via the first communication medium 6.

The telephone exchange 2 includes a local multiplexer 12 and a switching machine 14. The local multiplexer 12 converts analog or digital signals transmitted thereto by the switching machine 14 via a third communication medium 16 into digital signals for transmission to the remote multiplexer 4 via the first communication medium 6. The third communication medium 16 may be a digital facility, like the first communication medium 6, or may be one or more conductive wires, like the second communication medium 8. Local multiplexer 12 also converts digital signals transmitted thereto by the remote multiplexer 4 into analog or digital signals for transmission to the switching machine 14 via the third communication medium 16. The switching machine 14 enables two or more subscribers S to be selectively switched into communication with each other. A typical telephone network A is formed from a plurality of switching machines, local multiplexers and remote multiplexers of the type shown in FIG. 1 that form part of a larger telephone network (not shown) in a manner well known in the art.

In accordance with the present invention, a test head 18 and a test system 20 are connected to the switching machine 14 to provide one or more test signals to the switching machine 14. A remote telephone testing device 22 is preferably positioned between the telephone equipment 10 of one or more subscribers S and the remote multiplexer 4 servicing such telephone equipment 10. The switching machine 14 under control of the test system 20 via the test head 18 routes one or more test signals transmitted from the test system 20 to the remote telephone testing device 22 which is adapted to receive the test signals. The remote telephone testing device 22 performs one or more tests of the telephone equipment 10 of the subscriber S in accordance with the received one or more test signals and transmits to the switching machine 14 the results of such one or more tests. The switching machine 14 receives the results of the one or more tests transmitted by the remote telephone testing device 22 and routes the received results to the test system 20 via the test head 18. The results of the one or more tests on the telephone equipment 10 of the subscriber S is received by the test system 20 where it is, for example, analyzed and/or stored for subsequent processing. Preferably, test signals, test results and the like are passed between the switching machine 14 and the telephone equipment 10 being tested utilizing the local multiplexer 12, the remote multiplexer 4 and the first, second and third communication mediums 6, 8 and 16.

Figure 2:
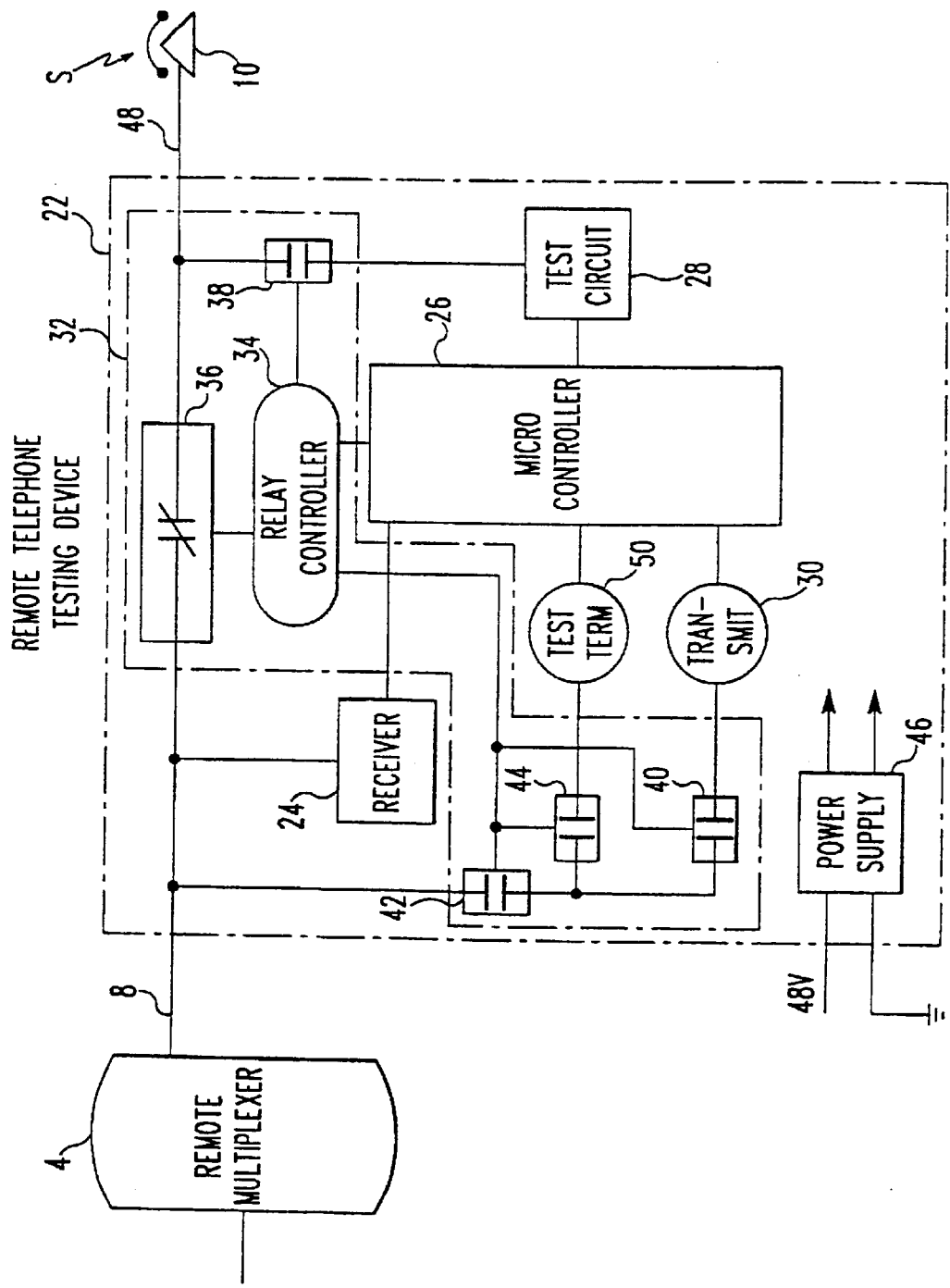
FIG. 2 is a diagrammatic illustration of one embodiment of the remote telephone testing device shown in FIG. 1.

With reference to FIG. 2 and with continuing reference to FIG. 1, in accordance with one embodiment of the invention, the telephone equipment 10 of each subscriber S to be tested is provided with a dedicated remote telephone testing device 22. The remote telephone testing device 22 includes a receiver 24 which monitors communication activity, i.e., signals, occurring on the second communication medium 8 between the telephone equipment 10 and the remote multiplexer 4. A controller 26, such as a microprocessor, is connected to receive the output of the receiver 24. The controller 26 includes certain elements, such as I/O ports, memory units, e.g., RAM and ROM, and the like, that are well known in the art and are not shown in FIGS. 2 and 3 for simplicity purposes.

The operation of the controller 26 is directed by a software program stored in the memory unit of the controller 26. Under the direction of the software program, the controller 26 monitors the receiver 24 to detect if signals appearing at the receiver 24 are intended for the controller 26. The software program also controls the operation of a test circuit 28, a transmitter 30 and a relay means 32 which includes a relay controller 34 and a plurality of relays 36, 38, 40, 42 and 44 (to be described in greater detail hereinafter). The remote telephone testing device 22 includes a power supply 46 which converts incoming electrical power, e.g., 48 volts, to one or more voltage levels useable by other components of the remote telephone testing device 22, such as, without limitation, the receiver 24, the controller 26, the test circuit 28, the transmitter 30 and/or the relay means 32.

In operation, a test signal received by the receiver 24 is interpreted by the controller 26 which responds by signaling the relay controller 34 to open the first, normally closed, relay 36; close the second, normally open, relay 38; close the third, normally open, relay 40; and close the fourth, normally open, relay 42. Opening the first relay 36 communicatively isolates the telephone equipment 10 from the remote multiplexer 4. Closing the second relay 38 connects the test circuit 28 into communication with the telephone equipment 10 or, more specifically, to the telephone equipment side of the first relay 36. Closing the third relay 40 and the fourth relay 42 connects the transmitter 30 into communication with the switching machine 14 via the multiplexers 4, 12 and the communication mediums 6, 8 and 16. More specifically, closing the third relay 40 and the fourth relay 42 connects the transmitter 30 to the receiver side of the first relay 36. Preferably, the controller 26 responds to the test signal by transmitting an acknowledgment signal to the switching machine 14 via the transmitter 30.

The controller 26 causes the test circuit 28 to initiate testing of the telephone equipment 10. Testing of the telephone equipment 10, and hence a telephone line 48 extending between the test circuit 28 and the telephone equipment 10, may include, without limitation, AC and DC measurements thereof. The results of testing the telephone equipment 10 is conveyed by the test circuit 28 to the controller 26 for transmission to the test system 20 via the transmitter 30. Once test results have been communicated to the test system 20, the controller 26 causes the first, second, third and fourth relays 36, 38, 40 and 42, respectively, to return to their normal states. Alternatively, the controller 26 awaits a test termination signal from the test system 20 before returning the relays to their normal states. Hence, after testing, the test circuit 28 and the transmitter 30 are electrically isolated from the telephone equipment 10 and the receiver side of the first relay 36, respectively, and the telephone equipment 10 is communicatively connected to the remote multiplexer 4.

The operation of the test circuit 28 may be directed by the controller 26 running under control of a software program stored in the memory unit of the controller 26. Alternatively, the operation of the test circuit 28 may be directed from the test system 20 via the controller 26.

Preferably, the remote telephone testing device 22 includes a test termination 50 connected between the controller 26 and the fifth relay 44. The test termination 50 enables voice frequency testing of the communication circuit path extending between the test system 20 and the test termination 50. This communication circuit path includes test head 18, switching machine 14, multiplexers 4, 12 and communication mediums 6, 8 and 16. In operation, the controller 26 responds to the test signal received by the receiver 24 by connecting the test termination 50 to the receiver side of the first relay 36, and hence, to the second communication medium 8 extending between the remote multiplexer 4 and the test termination 50. If the first through fourth relays 36–42 are connected in the above described manner to enable test circuit 28 to test the telephone equipment 10, the controller 26 simply signals the relay controller 34 to close the fifth, normally open, relay 44. Alternatively, if relays 36–44 of the remote telephone testing device 22 are in their normal states, the controller 26 enables voice frequency testing of the communication signal path by switching the states of the first relay 36 and the third through fifth relays 40–44. In this manner, the telephone equipment 10 is communicatively isolated from the remote multiplexer 4 and the transmitter 30 and test termination 50 are communicatively connected to the remote multiplexer 4. Thereafter, the controller 26 transmits, via the transmitter 30 and the closed third and fourth relays 40, 42, an acknowledgment to the test system 20 that the test signal has been received. In response to the acknowledgment from the controller 26, the test system 20 initiates voice testing of the communication signal path. When voice testing is complete, the test system 20 transmits a test termination signal to the controller 26 via the receiver 24 which responds by causing at least the fifth relay 44 to open thereby isolating the test termination 50 from the second communication medium 8.

Figure 3:
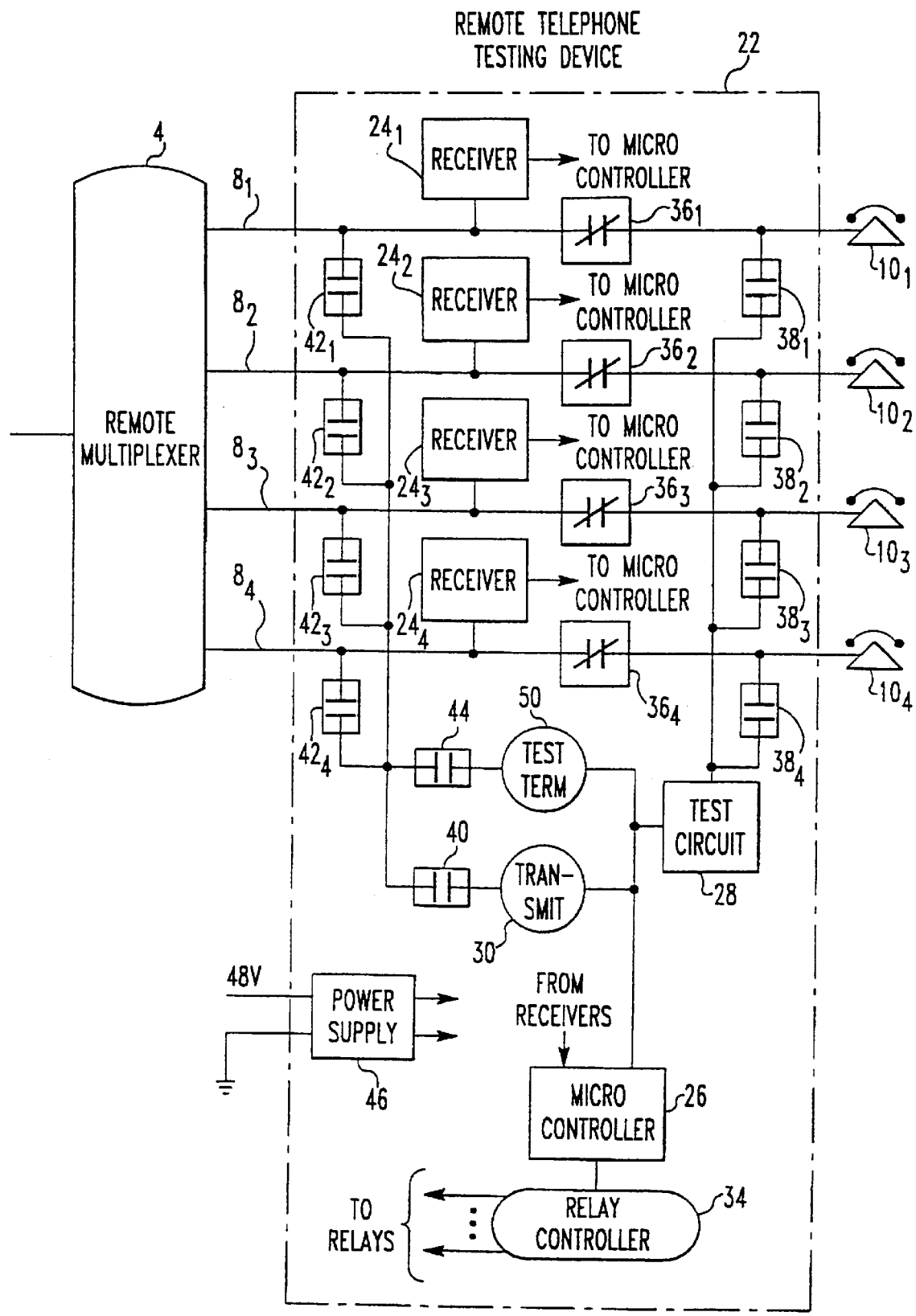
FIG. 3 is a diagrammatic illustration of another embodiment of the remote telephone testing device shown in FIG. 1.

With reference to FIG. 3 and with continuing reference to FIG. 1, in another embodiment, the remote telephone testing device 22 includes a plurality of receivers $24_1$–$24_4$; a plurality of first relays $36_1$–$36_4$; a plurality of second relays $38_1$–$38_4$; a third relay 40; a plurality of fourth relays $42_1$–$42_4$; and a fifth relay 44. The plurality of receivers $24_1$–$24_4$ are connected to convey signals received on a plurality of second communication mediums $8_1$–$8_4$ to the controller 26. The controller 26 is connected to test circuit 28, transmitter 30 and test termination 50, which operate in the manner set forth in connection with the embodiment shown in FIG. 2. The controller 26 and the relay controller 34, however, are adapted to activate the relays of the remote telephone testing device 22 so that only one of the plurality of telephone equipment $10_1$–$10_4$ is connected to the test circuit 28 for testing. Thus, for example, in response to receiver $24_1$ receiving a test signal, the controller 26 signals the relay controller 34 to switch the states of the relays associated with the telephone equipment $10_1$, i.e., relays $36_1$, $38_1$ 40 and $42_1$. In response to the relays $36_1$, $38_1$, 40 and $42_1$ switching state, the telephone equipment $10_1$ is communicatively isolated from the remote multiplexer 4 and is connected to the test circuit 28. The states of the other relays of the remote telephone testing device 22 of FIG. 3 are not switched and, therefore, the telephone equipment $10_2$–$10_4$ remain communicatively connected to the multiplexer 4. Hence, telephone equipment $10_1$ can be tested while respective telephone equipment $10_2$–$10_4$ are connected in service. Like the embodiment of FIG. 2, the test circuit 28 in FIG. 3 tests the telephone equipment $10_1$ and conveys the test results to the controller 26 which transmits the test results to the test system 20 via the transmitter 30. After testing, the controller 26 causes the relays $36_1$, $38_1$, 40 and $42_1$ associated with the telephone equipment $10_1$ to return to their normal state. Similarly, in response to one of the other receivers, e.g., $24_2$, receiving a test signal, the controller 26 signals the relay controller 34 to switch the states of the relays of the telephone equipment $10_2$–$10_4$ associated with the receiver receiving the test signal. Other relays of the remote telephone testing device 22 remain in their normal state so that the telephone equipment associated therewith is connected in service while one or more tests are conducted on the selected telephone equipment.

In an alternate embodiment of the remote telephone testing device 22 of FIG. 3, only one receiver, e.g. $24_1$, is provided. In response to receiving a test signal via the one receiver, the controller 26 and the relay controller 34 activate the relays so that the test circuit 28 sequentially tests each telephone equipment $10_1$–$10_4$ connected to the remote telephone testing device 22. Alternatively, the one receiver can receive one or more coded test signals on one of the second communications medium, e.g., $8_1$, that cause the controller 26 to test a select telephone equipment $10_1$–$10_4$. In this manner, one receiver can be utilized to test more than one telephone equipment $10_1$–$10_4$. Similarly, the transmitter 40 can be connectable to only one of the second communications medium, e.g., $8_1$, thereby avoiding the need to provide more than one fourth relay 42. In this later embodiment, only one of the second communications medium, e.g., $8_1$, is utilized to communicate test signals from the test system 20 and receive the test results of more than one telephone equipment $10_1$–$10_4$.

Referring back to FIG. 2, the fourth relay 42 is utilized to isolate the test termination 50, the transmitter 30 and the third and fifth relays 40, 44 from the second communication medium 8 thereby enabling the controller 26 to test the operation of the transmitter 30 communicating with the test termination 50. However, in the absence of a need to test the operation of the transmitter 30 the fourth relay 42 can be omitted. In contrast, in the embodiment of FIG. 3, the fourth relays $42_1$–$42_4$ are utilized to connect the transmitter 30 and/or test termination 50 to one of the plurality of second communication mediums, e.g., $8_1$, while enabling the transmitter 30 and/or test termination 50 to be isolated from the other of the plurality of second communication mediums.

From the foregoing, it can be seen that the present invention enables a circuit or channel utilized for voice communication to be also utilized for testing the telephone equipment 10 during intervals when a subscriber S is not utilizing the telephone equipment 10. The use of the voice communications channel avoids the need for a dedicated circuit or channel to enable testing of the telephone equipment. Hence, the present invention enables available voice communications channels to transmit test signals to the remote testing device and to receive test results back therefrom.

The invention has been described with reference to the preferred embodiments. Obvious modifications and alterations will occur to others upon reading and understanding the preceding detailed description. It is intended that the invention be construed as including all such modifications and alterations insofar as they come into the scope of the appended claims or the equivalents thereof.

What is claimed is:

1. A testing apparatus for testing telephone equipment of a subscriber which is communicatively connected to a multiplexer via a communication medium, the testing apparatus comprising:

a controller;

a test circuit connectable to the communication medium between the controller and the telephone equipment of the subscriber for testing the telephone equipment via the communication medium, wherein the communication medium is capable of conveying analog and digital signals;

a receiver connected to the communication medium between the multiplexer and the controller; and a relay means, wherein in response to the receiver receiving a test signal via the communication medium, the controller (i) causes the relay means to open the communication medium thereby separating the communication medium into a first part connected to the telephone equipment and a second part connected to the multiplexer whereby the telephone equipment is communicatively isolated from the multiplexer, and (ii) causes the relay means to connect the test circuit into communication with the telephone equipment via the first part of the communication medium connected thereto.

2. The testing apparatus as set forth in claim 1, further including:

a test termination connectable to the second part of the communication medium between the multiplexer and the controller, wherein in response to the receiver receiving the test signal via the communication medium, the controller causes the relay means to connect the test termination into communication with the multiplexer via the second part of the communication medium connected thereto.

3. The testing apparatus as set forth in claim 1, further including a transmitter connectable to the second part of the communication medium between the multiplexer and the controller, wherein in response to the receiver receiving the test signal via the communication medium, the controller causes the relay means to connect the transmitter into communication with the multiplexer via the second part of the communication medium connected thereto.

4. A testing apparatus for testing telephone equipment of a subscriber communicatively connected to a communication medium utilized to convey at least one of voice and data signals, the testing apparatus comprising:

a first relay disposed in the communication medium and having telephone equipment connected to one side thereof via the communication medium, wherein the communication medium is capable of conveying analog and digital signals;

a controller;

a receiver connected between the controller and the communication medium connected to a side of the first relay opposite the telephone equipment;

a second relay; and a test circuit, the second relay and the test circuit series connected between the controller and the communication medium connected to the telephone equipment side of the first relay, wherein in response to the receiver receiving a test signal via the communication medium the controller causes the first relay to open thereby disconnecting the communication medium connected to the receiver side of the first relay from the communication medium connected to the telephone equipment side thereof and causes the second relay to close thereby connecting the test circuit to the telephone equipment via the communication medium connected to the telephone equipment side of the first relay.

5. The testing apparatus as set forth in claim 4, further including:
   a transmitter; and
   a third relay, the transmitter and the third relay series connected between the controller and the communication medium connected to the receiver side of the first relay, wherein in response to the receiver receiving the test signal via the communication medium the controller causes the third relay to close thereby connecting the transmitter to the communication medium connected to the receiver side of the first relay.

6. The testing apparatus as set forth in claim 5, further including:
   a test termination; and
   a fourth relay, the test termination and the fourth relay series connected between the controller and the communication medium connected to the receiver side of the first relay, wherein in response to the receiver receiving the test signal via the communication medium the controller causes the fourth relay to close thereby connecting the test termination to the communication medium connected to the receiver side of the first relay.

7. The testing apparatus as set forth in claim 6, further including:
   a relay controller connected to the controller, the relay controller controlling the opening/closing of at least one of the first relay, the second relay, the third relay and the fourth relay in response to one or more signals from the controller.

8. The testing apparatus as set forth in claim 6, further including:
   a fifth relay series connected between the communication medium connected to the receiver side of the first relay and at least one of the transmitter and the test termination, wherein in response to the receiver receiving the test signal via the communication medium the controller causes the fifth relay to close thereby connecting the at least one of the transmitter and the test termination to the communication medium connected to the receiver side of the first relay.

9. A method of testing telephone equipment of a subscriber connected to a telephone switching network via a communication medium, the method comprising the steps of:
   receiving a signal via the communication medium, wherein the communication medium is capable of conveying analog and digital signals;
   in response to receiving the signal, opening the communication medium thereby separating the communication medium into a first part connected to the telephone equipment and a second part connected to the telephone switching network whereby the telephone equipment is communicatively isolated from the telephone switching network;
   connecting a test circuit to the telephone equipment via the first part of the communication medium connected thereto;
   testing the telephone equipment with the test circuit; and
   communicating a result of testing the telephone equipment to the telephone switching network via the second part of the communication medium connected thereto.

10. The method of testing telephone equipment of a subscriber as set forth in claim 9, further including the step of connecting a transmitter into communication with the telephone switching network via the second part of the communication medium connected thereto, wherein the transmitter enables one or more results of testing the telephone equipment to be communicated to the telephone switching network via the second part of the communication medium connected thereto.

11. The method of testing telephone equipment of a subscriber as set forth in claim 9, further including the step of connecting a test termination into communication with the telephone switching network via the second part of the communication medium connected thereto, the test termination providing impedance matching to the signal from the telephone switching network in the absence of the telephone equipment being communicatively connected to the telephone switching network via the communication medium.

12. The method of testing telephone equipment of a subscriber as set forth in claim 9, wherein the receiving step includes receiving the signal via a receiver communicatively connected to the telephone switching network via the communication medium connected thereto.

13. The method of testing telephone equipment of a subscriber as set forth in claim 12, further including the steps of:
   connecting a transmitter into communication with the telephone switching network via the second part of the communication medium connected thereto;
   communicating from the transmitter to the telephone switching network via the second part of the communication medium connected thereto an acknowledgment that the test signal has been received by the receiver; and
   communicating from the transmitter to the telephone switching network via the second part of the communication medium connected thereto one or more results of the testing of the telephone equipment.

14. The method of testing telephone equipment of a subscriber as set forth in claim 9, further including the steps of:
   disconnecting the test circuit from the first part of the communication medium connected to the telephone equipment; and
   connecting the first part of the communication medium connected to the telephone equipment to the second part of the communication medium connected to the telephone switching network thereby connecting the telephone equipment into communication with the telephone switching network.

15. The method of testing telephone equipment of a subscriber as set forth in claim 9, wherein:
   the step of opening the communication medium disconnects the telephone equipment from communication with a voice channel of a multiplexer disposed in the second part of the communication medium; and
   the communicating step includes communicating the result of testing to the voice channel of the multiplexer via the second part of the communication medium connected thereto.

16. A telephone network for communicatively connecting telephone equipment of a plurality of subscribers, the telephone network comprising:
   a switching apparatus adapted to communicatively connect together a plurality of communication medium connected to telephone equipment of a like plurality of subscribers, wherein each communication medium is capable of conveying analog and digital signals; and a testing apparatus connected to one of the communication medium between the switching apparatus and the telephone equipment of one of the subscribers connected thereto, the testing apparatus comprising:
  a test circuit for testing the telephone equipment via the one communication medium;
  a receiver;
  a transmitter; and
  a plurality of relays, wherein in response to the receiver receiving a test signal from the switching apparatus via the one communication medium:
    the plurality of relays (i) open the one communication medium thereby communicatively disconnecting the telephone of the one subscriber from the switching network and (ii) communicatively connect the test circuit to the telephone equipment of the one subscriber via the one communication medium connected thereto;
    the test circuit tests the telephone equipment of the one subscriber via the one communication medium connected thereto; and
    the transmitter communicates to the switching apparatus via the one communication medium connected thereto one or more results of the test of the telephone equipment of the one subscriber by the test circuit.

17. The telephone network as set forth in claim 16, wherein each of the plurality of communication medium comprises:
  a first communication medium connected between a first multiplexer and the switching apparatus;
  a second communication medium connected between the first multiplexer and a second multiplexer; and
  a third communication medium connected between the second multiplexer and the telephone equipment of the one subscriber, wherein:
    the first multiplexer converts signals received thereby between the first communication medium and the second communication medium and vice versa; and
    the second multiplexer converts signals received thereby between the second communication medium and a third communication medium and vice versa.

18. The telephone network as set forth in claim 16, further including a test head connected to the switching apparatus for transmitting the test signal to the testing apparatus and for receiving the one or more results of the test of the telephone equipment from the testing apparatus via the switching apparatus.

19. The telephone network as set forth in claim 16, wherein the testing apparatus further includes a test termination having a desired impedance, wherein in response to the receiver receiving the test signal from the switching apparatus via the one communication medium, one or more of the plurality of relays communicatively connected the test termination to the switching apparatus via the one communication medium connected thereto.

20. The telephone network as set forth in claim 16, wherein in response to the receiver receiving the test signal via the one communication medium connected thereto, the plurality of relays communicatively connect the transmitter to the switching apparatus via the one communication medium connected thereto.

21. The telephone network as set forth in claim 16, further including:
  a controller connected to the receiver, the transmitter and the test circuit; and
  a relay controller connected between the plurality of relays and the controller, wherein in response to the receiver receiving the test signal via the communication medium wherein:
    the controller causes the relay controller to control the opening/closing of the plurality of relays; and
    the controller controls the operation of at least one of the test circuit and the transmitter.

22. The telephone network as set forth in claim 17, wherein the plurality of relays communicatively disconnect the telephone equipment of the one subscriber from a voice channel of the first multiplexer, and the transmitter communicates via the one communication medium the one or more results to the voice channel of the first multiplexer.

* * * * *